Jan. 5, 1943.   C. H. MORROW   2,307,061
ELECTRIC WATER HEATER
Filed Aug. 13, 1941
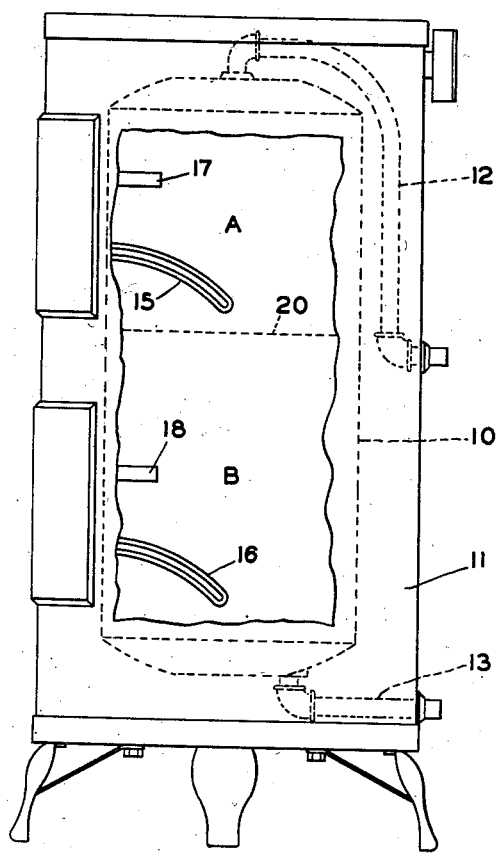
INVENTOR
CLARENCE H. MORROW
BY
Hyde and Meyer
ATTORNEY Patented Jan. 5, 1943

2,307,061

UNITED STATES PATENT OFFICE 2,307,061

ELECTRIC WATER HEATER

Clarence H. Morrow, Shaker Heights, Ohio, assignor to The Hotstream Heater Company, Cleveland, Ohio, a corporation of Ohio Application August 13, 1941, Serial No. 406,612

4 Claims. (Cl. 219—39)

This invention relates to improvements in electric water heaters for domestic use and of the character in which the water storage tank is provided with thermostatically controlled upper and lower electrical heating elements of the immersion type.

More particularly, the present invention relates to that type of electric water heater in which the lower heating element is operable only during off-peak periods, such as at night under time controlled mechanism, and in which the upper heating element is operable at any time under the control of its thermostat. For the heating elements of such water heaters, separate electric meters are generally utilized, and inasmuch as the cost of the electricity for the operation of the lower heating element during said off-peak periods is at a lower rate than that used for the operation of the upper heating element, it is obviously desirable to prevent unnecessary use of said upper heating element during such off-peak periods when the lower heating element is available for use.

The general object of the present invention, therefore, is the provision of a water heater of the type heretofore referred to in which the upper heating element is so constructed and arranged as to prevent unnecessary use thereof during off-peak periods when the lower and less costly to operate heating element is available for use.

Another object of the present invention is the provision of a water heater of the aforesaid type in which the upper heating element is so constructed and arranged that the bottom of the zone of water in the upper part of the storage tank (the water of which zone is heated by the upper heating element and to the temperature of which water the upper thermostat for such upper heating element is responsive) is located sufficiently below said upper thermostat that when the cooler water in the lower zone is rising as the result of the operation of the lower "off-peak" heating element, the temperature of the warmer water in the upper zone is normally not reduced by said rising cooler water sufficiently to actuate said upper thermostat to bring about operation of the upper heating element. As a result, said upper heating element is normally not brought into use during off-peak periods when the lower heating element is in use or available for use.

Another object of the present invention is the provision of a water heater in which the upper heating element has one portion thereof located in closely spaced relation (and hence in the desired sensitive relation) to the upper thermostat by which it is controlled, and another portion located at a lower level in the upper zone of water to which said upper thermostat is responsive, the lower located portion of said upper heating element serving to space the bottom of said upper zone of water a sufficient distance below said upper thermostat that said upper heating element is normally not brought into use during off-peak periods when the lower heating element is in use or available for use.

Another object of the present invention is the provision of a water heater of the aforesaid type in which the upper and lower heating element are of downwardly bowed or equivalent depending form, the depending character of the upper heating element enabling the zone of water heated thereby to have its bottom located sufficiently below the upper thermostat by which the upper heating element is controlled for the accomplishment of the purpose hereinbefore stated, and the depending character of the lower heating element enabling the water in the lowermost part of the lower zone of water in said water storage tank to be effectively heated thereby.

Another object of the present invention is the provision of a water heater of the aforesaid type in which the upper and lower heating elements are of exceedingly simple and inexpensive character and which, if desired, may be of identical form for interchangeable use.

Further objects of the present invention are in part obvious and in part will appear from the following description of one embodiment thereof, reference being had to the accompanying drawing in which the single figure shows more or less generally an electric water heater of the aforesaid type, the upper and lower heating elements being constructed and arranged in accordance with one form of the present invention, a portion of the side wall of the water storage tank and its enclosing casing being broken away to show said heating elements and their thermostats.

Before the present invention is described in detail, it is to be understood that such invention is not limited to the details of construction and/or the specific arrangement of parts herein illustrated and/or described, as the invention obviously may take other forms. It also is to be understood that the phraseology or terminology herein employed is for the purpose of description and not of limitation.

Inasmuch as the present invention relates to a type of electric water heater which is of old and well known form, it is unnecessary for the drawing of this application to illustrate, or for this specification to describe, all of the structural details of such a water heater or its electrical circuits. Said drawing therefore illustrates such a water heater more or less generally, and before describing in detail the nature of one form of the present invention, the general form of said water heater will first be more or less briefly referred to.

As shown, said water heater comprises a suitable metallic water storage tank 10 which is arranged within an insulated casing 11. Communicating with the upper end of said tank is a hot water draw-off pipe 12 and communicating with the lower end of said tank is a cold water inlet pipe 13. For heating the water in said tank, two electrical heating elements of the well known immersion type are utilized, the construction and arrangement of which, in accordance with one form of the present invention, will be hereinafter referred to. For the present, may it be said that there is an upper heating element 15 and a lower heating element 16, each of which includes a suitable heating or resistance member and an enclosing metal sheath, as is usual. The outer ends of both heating elements are suitably supported in the side wall of the tank 10 or its enclosing casing 11 and for each element, a separate electrical circuit (not here shown) is provided. Included in each circuit is a suitable thermostat for controlling the operation of the heating element of that circuit in accordance with the temperature of the water in the storage tank 10, the thermostats 17 and 18 here shown being of the well known immersion type with their outer ends suitably supported by the tank side wall or otherwise. As is usual, each thermostat is arranged above the heating element which it is to control, and as will be readily understood, the upper thermostat 17 controls the operation of the upper heating element 15 in accordance with the temperature of the zone of water A in the upper part of the water storage tank 10. Similarly, the lower thermostat 18 controls the operation of the lower heating element 16 in accordance with the temperature of the zone of water B in the lower part of said storage tank.

In order to reduce the operating cost of such a water heater, suitable timing mechanism (not shown) is included in the electrical circuit for the lower heating element 16 so as to restrict the use of such element to off-peak periods, such as at night, when reduced electrical rates are available. The electrical circuit for each of the two heating elements therefore includes its own electric meter, and inasmuch as the current flowing through the meter for the upper heating element 15 is at a higher rate than the "off-peak" current flowing through the meter for the lower heating element 16, it obviously is desirable to avoid unnecessary use of said upper heating element during off-peak periods when the lower and less costly to operate heating element 16 is available for use.

The accomplishment of that result, in a simple and inexpensive manner, is the primary object of the present invention. The accomplishment of that result is effected, in a most satisfactory manner, by locating the bottom 20 of the upper zone of water A, to which the upper thermostat 17 is solely responsive, sufficiently below said upper thermostat that when the cooler water in the lower zone B rises during off-peak periods as the result of the operation of the lower heating element 16 or for any other reason, the temperature of the warmer water of the upper zone A is not normally reduced sufficiently by rise of such cooler water to actuate the upper thermostat 17 and thereby bring about the operation of the upper heating element. In order to locate the bottom 20 of the upper zone of water A sufficiently below the upper thermostat 17 to avoid unnecessary use of the upper heating element 15 during off-peak periods, said upper heating element is bent or curved downwardly, as shown, the construction of the usual immersion type heating element being such that it may be readily given a depending disposition.

As a result, during off-peak periods, when the lower heating element 16 is available for use under the control of its thermostat 18, the upper heating element 15 is not normally brought into use, although it is available and may come into use if circumstances compel it. Moreover, the bottom of the upper zone of water A is located the necessary distance below the upper thermostat 17 while still maintaining the outer and upper end portion of the upper heating element in closely spaced relationship with the upper thermostat 17. As a result, there is no reduction in the sensitive control which said upper thermostat exercises over said upper heating element. Therefore, if through inadvertence or otherwise, the upper heating element is put into operation when the water storage tank 10 is empty (such as during the installation of the water heater or after its storage tank has been drained), the heat from said upper heating element will so quickly actuate the upper thermostat 17 to terminate the operation of said upper heating element as to effectively prevent any likelihood of damage to said element.

As shown, the lower heating element 16 is also given a depending disposition, one of the results thereof being to enable the water at the bottom of the storage tank 10 to be effectively heated by said element, as will be readily understood. Although the two heating elements 15 and 16 may differ, such as in their heating capacities or otherwise, they may, if desired, be of duplicate character as here shown, and therefore adapted for interchangeable use, with simplification of manufacture and ease of assembly.

Further features of the present invention will be apparent to those skilled in the art to which it relates.

What I claim is:

1. An electric water heater, comprising a water storage tank, and upper and lower electric heating elements for heating the water in said tank, said upper heating element being under the control of an upper thermostat responsive solely to the temperature of an upper zone of water in said tank and said lower heating element being under the control of a lower thermostat responsive to the temperature of a lower zone of water in said tank and also under the control of means which restricts its use to predetermined time periods, said upper heating element being constructed and arranged to locate the bottom of said upper zone of water sufficiently below the upper thermostat that the rise of water in said lower zone by the operation of said lower heating element during such predetermined time periods is normally incapable of actuating the upper thermostat to bring about operation of said upper heating element during such predetermined time periods.

2. An electric water heater, comprising a water storage tank, and upper and lower electric heating elements for heating the water in said tank, said upper heating element being under the control of an upper thermostat responsive solely to the temperature of an upper zone of water in said tank and said lower heating element being under the control of a lower thermostat responsive to the temperature of a lower zone of water in said tank and also under the control of means which restricts its use to predetermined time periods, said upper heating element having a portion located at one level in said upper zone of water and in closely spaced relation to said upper thermostat and another portion located at a lower level in said upper zone to thereby space the bottom of said upper zone of water sufficiently below the upper thermostat that the rise of water in said lower zone by the operation of said lower heating element during such predetermined time periods is normally incapable of actuating the upper thermostat to bring about operation of said upper heating element during such predetermined time periods.

3. An electric water heater, comprising a water storage tank, and upper and lower electric heating elements for heating the water in said tank, said upper heating element being under the control of an upper thermostat responsive solely to the temperature of an upper zone of water in said tank and said lower heating element being under the control of a lower thermostat responsive to the temperature of a lower zone of water in said tank and also under the control of means which restricts its use to predetermined time periods, said upper heating element having one portion below the upper thermostat and closely spaced thereto and another portion depending from said first mentioned portion, the depending portion of said upper heating element serving to locate the bottom of said upper zone of water sufficiently below the upper thermostat that the rise of water in said lower zone by the operation of said lower heating element during such predetermined time periods is normally incapable of actuating the upper thermostat to bring about operation of said upper heating element during such predetermined time periods, and said lower heating element also having one portion in closely spaced relationship to the lower thermostat and another portion depending from said first mentioned portion, the depending portion of said lower heating element serving to facilitate the heating of the water at the bottom of said lower zone.

4. An electric water heater, comprising a water storage tank, upper and lower electric heating elements of duplicate character and of downwardly bowed form for heaating the water in said tank, said upper heating element being under the control of an upper thermostat responsive solely to the temperature of an upper zone of water in said tank and said lower heating element being under the control of a lower thermostat responsive to the temperature of a lower zone of water in said tank and also under the control of means which restricts its use to predetermined time periods, the downwardly bowed form of said upper heating element causing the bottom of said upper zone of water to be located sufficiently below said upper thermostat that the rise of water in said lower zone by the operation of said lower heating element during such predetermined time periods is normally incapable of actuating the upper thermostat to bring about operation of said upper heating element during such predetermined time periods, and the downwardly bowed form of said lower heating element enabling the water at the bottom of the lower zone to be more effectively heated thereby.

CLARENCE H. MORROW.